United States Patent
Haroun et al.

(10) Patent No.: US 11,428,790 B2
(45) Date of Patent: Aug. 30, 2022

(54) NARROWBAND TIA AND SIGNALING FOR OPTICAL DISTANCE MEASUREMENT SYSTEMS

(71) Applicant: TEXAS INSTRUMENTS INCORPORATED, Dallas, TX (US)

(72) Inventors: Baher S. Haroun, Allen, TX (US); Nirmal C. Warke, Saratoga, CA (US); David P. Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 981 days.

(21) Appl. No.: 15/613,835

(22) Filed: Jun. 5, 2017

(65) Prior Publication Data

US 2018/0348345 A1    Dec. 6, 2018

(51) Int. Cl.
    *G01S 7/4861* (2020.01)
    *G01S 7/4865* (2020.01)
    *G01S 17/26* (2020.01)

(52) U.S. Cl.
    CPC .......... *G01S 7/4861* (2013.01); *G01S 7/4865* (2013.01); *G01S 17/26* (2020.01)

(58) Field of Classification Search
    CPC ...... G01S 7/4861; G01S 17/26; G01S 7/4865; G01S 17/10; G01S 17/931; G01S 7/486; G01S 7/4868; H01J 40/14; H03F 1/00; H03F 1/0211; H03F 1/083; H03F 1/32; H03F 2203/45586; H03F 2203/45601; H03F 3/087; H03F 3/3432; H03F 3/4517; H03F 3/45269; H03F 3/45475; H03F 3/68; H03F 1/34; H03F 1/342; H03F 3/45493;

(Continued)

(56) References Cited

U.S. PATENT DOCUMENTS

| | | |
|---|---|---|
| 4,521,107 A | 6/1985 | Chaborshi et al. |
| 4,561,175 A | 12/1985 | Kawasumi |

(Continued)

FOREIGN PATENT DOCUMENTS

CN        102667521 B        9/2012

OTHER PUBLICATIONS

CalcTown Narrow Band-pass Filter Calculator. Mar. 10, 2017. https://www.calctown.com/calculators/narrow-bandpass-filter (Year: 2017).*

(Continued)

*Primary Examiner* — Yuqing Xiao
*Assistant Examiner* — Amir J Askarian
(74) *Attorney, Agent, or Firm* — Ray A. King; Charles A. Brill; Frank D. Cimino

(57) ABSTRACT

An optical distance measurement system includes a transmission circuit and a receive circuit. The transmission circuit is configured to generate narrowband intensity modulated light transmission signals over a first band of frequencies and direct the narrowband light transmission signal toward a target object. The receive circuit is configured to receive reflected light off the target object, convert the reflected light into a current signal proportional to the intensity of the reflected light, filter frequencies outside a second band of frequencies from the current signal to create a filtered current signal, and convert the filtered current signal into a voltage signal. The second band of frequencies corresponds with the first band of frequencies.

6 Claims, 3 Drawing Sheets

(58) Field of Classification Search
CPC .. H03F 3/456; H03F 3/45748; H03F 3/45973; H04B 10/503; H04B 10/60
See application file for complete search history.

(56) References Cited

U.S. PATENT DOCUMENTS

| | | | |
|---|---|---|---|
| 4,584,477 A | 4/1986 | Koshino et al. | |
| 9,407,304 B1* | 8/2016 | Pawliuk | H03D 7/1466 |
| 9,960,684 B2* | 5/2018 | Luccato | H02M 1/34 |
| 2005/0275466 A1* | 12/2005 | Dasgupta | H03F 3/08 |
| | | | 330/308 |
| 2007/0139200 A1 | 6/2007 | Yushkov et al. | |
| 2007/0146683 A1 | 6/2007 | Ohtomo et al. | |
| 2011/0017904 A1* | 1/2011 | Stutz | H04B 10/693 |
| | | | 250/216 |
| 2012/0287417 A1 | 11/2012 | Mimeault | |
| 2013/0154873 A1 | 6/2013 | Raz et al. | |
| 2015/0076329 A1* | 3/2015 | Yin | H03F 3/45475 |
| | | | 250/214 A |

OTHER PUBLICATIONS

International Search Report for PCT/US2018/036093 dated Dec. 6, 2018.
Chadha, et al. "Bandwidth Extension of Transimpedance Amplifier Using Active Inductor" International Journal of Scientific & Engineering Research, vol. 3 Issue 10; Oct. 2012; 4 pages.
CNIP Office Action Search Report dated Jun. 17, 2021.
"A Study on the Capacity Measurement Techniques for the Large Oil Storage Caves, "China's Excellent Master's Thesis Full-text Database Engineering Science and Technology Series I"" Liang Xuemin, Mar. 15, 2014.

\* cited by examiner

NARROWBAND TIA AND SIGNALING FOR OPTICAL DISTANCE MEASUREMENT SYSTEMS

BACKGROUND

Light Detection And Ranging (LiDAR) is a system that measures the distance to a target object by reflecting a laser pulse sequence (a single narrow pulse or sequence of modulated narrow pulses) off of the target and analyzing the reflected light. More specifically, LiDAR systems typically determine a time of flight (TOF) for the laser pulse to travel from the laser to the target object and return either directly or by analyzing the phase shift between the reflected light signal and the transmitted light signal. The distance to the target object then may be determined based on the TOF. These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

SUMMARY

In accordance with at least one embodiment of the invention, an optical distance measurement system includes a transmission circuit and a receive circuit. The transmission circuit is configured to generate narrowband light transmission signals over a first band of frequencies and direct the narrowband light transmission signal toward a target object. The receive circuit is configured to receive light reflected off the target object, convert the reflected light into a current signal proportional to the intensity of the reflected light, filter frequencies outside a second band of frequencies from the current signal to create a filtered current signal, and convert the filtered current signal into a voltage signal. The second band of frequencies corresponds with the first band of frequencies.

Another illustrative embodiment is an optical distance measurement receiver that includes a photodiode, a bandpass network, and a transimpedance amplifier (TIA). The photodiode is configured to receive light reflected off a target object over a first band of frequencies. The photodiode is also configured to convert the reflected light into a first current signal which is proportional to the intensity of the reflected light. The bandpass network is configured to receive the first current signal from the photodiode and filter frequencies outside a second band of frequencies from the first current signal to create a first filtered current signal. The second band of frequencies corresponds with the first band of frequencies. The TIA is configured to receive the first filtered current signal from the bandpass network and convert the first filtered current signal into a first voltage signal corresponding with the first filtered current signal.

Yet another illustrative embodiment is a method for determining a distance to a target object. The method includes receiving light reflected off the target object over a first band of frequencies. The method also includes converting the reflected light into a current signal proportional to the intensity of the reflected light. The method also includes filtering frequencies outside a second band of frequencies from the current signal to create a filtered current signal, the second band of frequencies corresponding with the first band of frequencies. The method also includes converting the filtered current signal into a voltage signal. The method also includes determining the distance to the target object based on the voltage signal.

BRIEF DESCRIPTION OF THE DRAWINGS

For a detailed description of various examples, reference will now be made to the accompanying drawings in which.

NOTATION AND NOMENCLATURE

Figure 1:
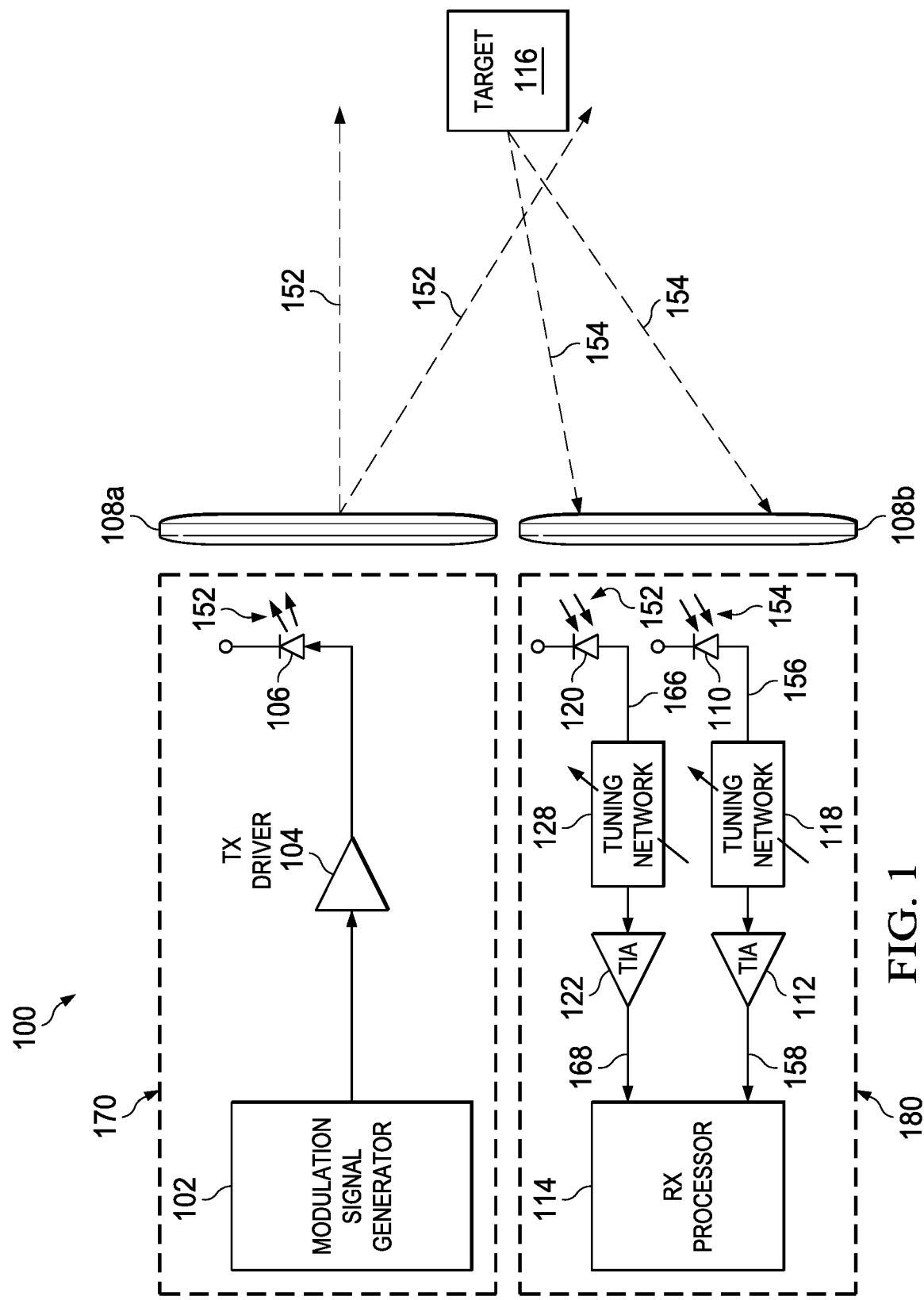
FIG. 1 shows an illustrative optical distance measurement system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical distance measurement systems, such as LiDAR systems, may determine distances to various target objects utilizing the time of flight (TOF) of an optical signal (i.e., a light signal) to the target object and its reflection off a target object back to the LiDAR system (return signal). These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

Conventional LiDAR systems include a transmitter for transmitting the light signal toward the target object and a receiver for receiving the return signal. Conventional LiDAR receivers include a photodiode (i.e., detector) to receive the return signal and convert the light in the return signal into a current. A TIA then converts the current into a voltage which may be analyzed by a processor to determine TOF and ultimately distance to the target object. In order to achieve a wide optical field of view (FoV) LiDAR system, a large area photodiode is utilized to receive the reflected light in the return signal. Such large area photodiodes inherently have high capacitance. The high capacitance of the photodiode has two degrading effects on performance of the LiDAR system: 1) limiting bandwidth and 2) amplifying the voltage noise of the TIA. Ranging performance (i.e., the accuracy of the ranging determination) is determined by two parameters: 1) the slope of the transmitted/received waveform and 2) noise in the received signal. For example, $$\sigma_t = \frac{\frac{\sigma_n}{\text{slope}}}{\sqrt{N_{edges}}}$$

where $\sigma_t$ is the timing standard deviation, $\sigma_n$ is the standard deviation of the noise, slope is the slope of the received waveform, and $N_{edges}$ is the number of edges in the transmitted/received waveform that are used for timing estimation. Both the slope and the noise are adversely impacted by the high capacitance of the large area photodiode resulting in degraded ranging performance. Therefore, there is a need to develop a LiDAR system that provides increased ranging performance by increasing the slope of the transmitted/received waveform and/or reducing the noise in the received signal.

In accordance with various examples, an optical distance measurement system is provided in which the receiver includes a narrow bandpass network tuned to high frequency. In some embodiments, this bandpass network is located at the input of the TIA. The bandpass network is optimized to have a maximum signal-to-noise ratio (SNR) in band. Noise shaping techniques are used so that noise is moved out of band, and thus, removed from the received signal. In some embodiments, to fully utilize this narrowband receiver, the transmitted light signal is modulated to be narrowband at the tuned frequency. This design enables a high slope for the transmitted/received waveform as well as low noise to provide high precision ranging performance.

FIG. 1 shows an illustrative optical distance measurement system 100 in accordance with various examples. In some embodiments, the optical distance measurement system 100 is a LiDAR system. The optical distance measurement system 100, as shown in exemplary FIG. 1, includes a transmitter 170, receiver 180, optics 108a and 108b, and target object 116. The transmitter includes a modulation signal generator 102, a transmission driver 104, and a laser diode 106. The modulation signal generator 102 is configured to generate modulated narrowband carrier signals in a first band of frequencies. In other words, the modulation signal generator 102 is configured to generate a modulated carrier signal.

The modulation signal generator 102 is configured to provide phase, frequency, amplitude, and/or position modulation of the carrier signal. For example, the modulation signal generator 102, in an embodiment, is configured to generate a single tone signal. In some embodiments, the modulation signal generator 102 is configured to generate a single tone (i.e., continuous wave), a single tone with phase modulation (e.g., phase shift keying), a single tone with amplitude modulation (e.g., amplitude shift keying), multiple tones with fixed frequencies (e.g., frequency shift keying), a signal with frequency modulation over a narrowband frequency range (e.g., a chirp), and/or a signal with narrowband, pulse position modulation.

The transmission driver 104 is configured to drive (regulate the current) the laser diode 106 so that the laser diode 106 generates optical transmission signals 152 (narrowband light transmission signals) that correspond with the modulated narrowband carrier signals generated by the modulation signal generator 102. In some embodiments, because the signal generated by the modulation signal generator 102 is a modulated narrowband carrier signal, the transmission driver 104 is optimized for narrowband modulation of current through the laser diode 106. Thus, the laser diode 106 generates narrowband light transmission signals over a first band of frequencies. Hence, for example, if the modulated carrier signal is a single tone signal, then the power spectral density (PSD) of the generated narrowband light transmission signal will peak at the desired operating frequency (e.g., 100 MHz). To increase bandwidth in the system, as discussed above, the modulation signal generator 102 may generate a multi tone signal. Thus, around the desired operating frequency, the frequency of the signal is changed at discrete intervals which widens the frequency band in which the PSD of the generated narrowband light transmission signal is at its peak. While laser diode 106 is shown in FIG. 1, any type of optical signal generator (e.g., a light emitting diode (LED)) may be utilized to generate the optical transmission signals.

The optics 108a are configured to direct the generated narrowband light transmission signals 152 toward the target object 116. For example, the optics 108a, in an embodiment, include one or more lenses that focus the light transmission signals 152 on the target object 116. The optics 108a may include any type of optical system to direct the generated narrowband light transmission signals 152 toward the target object 116.

The light transmission signals 152 reflect off of the target object 116 as reflected light signals 154. The reflected light signals 154 then are received by the optics 108b which focus and/or direct the reflected light signals 154 to the receiver 180 and more particularly, onto the photodiode 110. For example, the optics 108b, in an embodiment, include one or more lenses that focus the reflected light signals 154 on the photodiode 110. The optics 108b may include any type of optical system to direct the reflected light signals toward the receiver 180.

The receiver 180 includes a photodiode 110, tuning network 118, TIA 112, and processor 114. In some embodiments, the receiver 180 also includes the photodiode 120, tuning network 128, and TIA 122. The photodiode 110 is configured to receive the reflected light signals 154 and convert the reflected light signals 154 into a current signal 156 that is proportional to the intensity of the received reflected light. The tuning network 118 is configured to tune the receiver 180 to the resonant frequency of the light transmission signals 152, and thus, the reflected light signals 154. The tuning network 118 is tunable, in an embodiment, using tuning capacitors and/or tuning through an inductor network. For example, the tuning network 118, in an embodiment, includes a bandpass network and tuning capacitors and/or inductors allowing the bandpass network to be electronically (analog or digital) tunable to achieve an optimal bandpass filter response. The bandpass network filters frequencies outside a second band of frequencies from the current signal 156. The second band of frequencies corresponds with the first band of frequencies that the narrowband light transmission signals 152 are transmitted. For example, if the desired operating frequency of the narrowband light transmission signals 152 is 100 MHz, then the second band of frequencies may correspond with the 100 MHz desired operating frequency (e.g., the second band of frequencies may be from 90 MHz to 110 MHz with the desired operating frequency being the center frequency of the second band of frequencies). Thus, only the current signal 156 and noise within the current signal 156 within the second band of frequencies is provided to the TIA 112 as a filtered current signal. In other words, much of the noise received by the receiver 180 in the current signal 156 is filtered out prior to the signal being analyzed to determine the distance to the target object 116.

The TIA 112 is configured to convert the filtered current signal into a voltage signal 158 that corresponds with the filtered current signal. In some embodiments, the tuning network 118 (e.g., the bandpass network) and the TIA 112 are reversed such that the TIA 112 converts the current signal 156 into a voltage signal that corresponds with the current signal, and the tuning network 118 filters out frequencies that are outside of the second band of frequencies from the voltage signal to generate a filtered voltage signal. In some embodiments, the tuning network 118 is integrated into the TIA 112.

Photodiode 120, in an embodiment, receives the light transmission signals 152, or a portion of the light transmission signals 152, directly from the laser diode 106 and converts the light transmission signals 152 into current reference signal 166 (a current that is proportional to the intensity of the received light directly from laser diode 106). The tuning network 128 (e.g., a tuning network similar as and/or the same as tuning network 118) is configured, in an embodiment, to act as a bandpass network and filter frequencies outside the second band of frequencies from the current signal 166. The second band of frequencies corresponds with the first band of frequencies that the narrowband light transmission signals 152 are transmitted. Thus, only the current signal 166 and noise within the current signal 166 within the second band of frequencies is provided to the TIA 122 as a filtered current signal. In other words, much of the noise received directly by the receiver 180 in the current reference signal 166 is filtered out prior to the signal being analyzed to determine the distance to the target object 116. TIA 122 is configured to receive current reference signal 166 and convert the current reference signal 166 into a voltage signal, designated as voltage reference signal 168, that corresponds with the current reference signal 166. In some embodiments, in addition to or instead of the current reference signal 166 being filtered by the tuning network 128 prior to being received by the TIA 122, the voltage reference signal 168 is filtered by tuning network 128 prior to being received by the processor 114. In another embodiment, the light transmission signals 152, or a portion of the light transmission signals 152, directly received from the laser diode 106 and the reflected light signals 154 both use the same path (e.g., photodiode 120, bandpass network 118, TIA 112) to generate the voltage signal 158 and the voltage reference signal 168.

The processor 114 is any type of processor, controller, microcontroller, and/or microprocessor with an architecture optimized for processing the voltage signal 158 and/or the voltage signal 168 to determine a TOF and/or a distance to the target object 116. For example, the processor 408 may be a digital signal processor (DSP), a central processing unit (CPU), a reduced instruction set computing (RISC) core such as an advanced RISC machine (ARM) core, a mixed signal processor (MSP), etc. Thus, for example, processor 118 may be a microprocessor configured to perform calculations to determine a TOF for the narrowband light transmission signals 152 and reflected light 154 to travel from the transmitter 170 to the receiver 180.

For example, the processor 114, in an embodiment, makes a determination of the TOF based on a direct time of flight of the narrowband light transmission signals 152. To make a direct determination of the TOF, a correlation function is performed using the reference signal (i.e., the voltage reference signal 168 corresponding to the light transmission signals 152) and the received signal (i.e., the voltage signal 158 corresponding to the reflected light signals 154). A peak in the correlation function corresponds to the time delay of the received reflected light signals 154 (i.e., the TOF). The distance to the target objects then can be estimated. For example, the speed of light is known, so the distance to the target object 116 is determined and/or estimated as $$d = \frac{c * TOF}{2}$$

where d is the distance to the target object, c is the speed of light, and TOF is the time of flight. The speed of light times the TOF is halved to account for the travel of the light pulse to, and from, the target object 116. In other embodiments, an FFT is performed on the received signal (i.e., the voltage signal 158 corresponding to the reflected light signals 154) and/or the reference signal (i.e., the voltage reference signal 168 corresponding to the light transmission signals 152). A phase of the tone then is used to estimate the delay (i.e., TOF) in the received signals. The distance then can be estimated using the formula discussed above.

Figure 2:
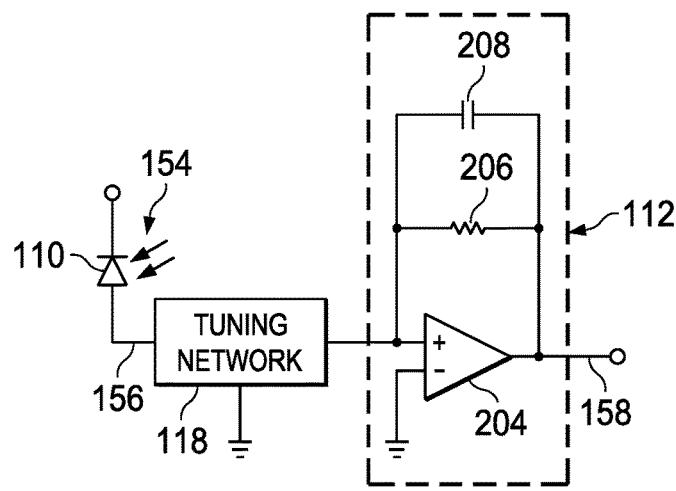
FIG. 2 shows an illustrative optical distance measurement receiver in accordance with various examples.

FIG. 2 shows an illustrative optical distance measurement receiver 180, without the processor 114 shown, in accordance with various examples. As discussed above, the receiver 180 includes a photodiode 110, a tuning network 118, and TIA 112. The TIA 112, as shown in FIG. 2, includes an operational amplifier 204, a feedback resistor 206 and a feedback capacitor 208. In the embodiment shown in FIG. 2, the resistor 206 is connected in parallel with the operational amplifier 206 and the capacitor 208. When the reflected light 154 is received by the photodiode 110, the photodiode 110 generates the current signal 156 proportional to the intensity of the light received by the photodiode 110. The tuning network 118, which can include any type of bandpass network (e.g., any type of bandpass filter) filters the current signal 156 so that frequencies outside of a band of frequencies centered by the desired operating frequency are filtered out of the current signal 156 to generate a filtered current signal. The operational amplifier 204, as shown in FIG. 2, is a differential input, single-ended output electronic amplifier. In some embodiments, the operational amplifier 204 has a relatively high impedance, therefore, the filtered current signal flows through the resistor 206. Thus, the output voltage, shown as voltage signal 158, is equal to the filtered current signal times the value of the resistor 206. The capacitor 208 provides stability for the TIA 112. Without the tuning network 118 acting as a bandpass network (i.e., in a conventional configuration), the TIA 112 would act as a low pass filter on the current signal 156 instead of a bandpass filter as shown in FIG. 2. Therefore, the conventional configuration allows more noise through the system, thus, reducing ranging precision.

Figure 3:
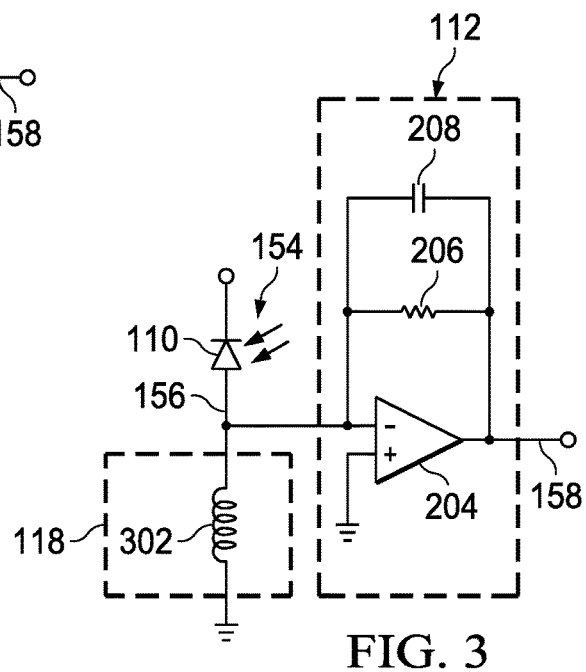
FIG. 3 shows an illustrative optical distance measurement receiver in accordance with various examples.

FIG. 3 shows an illustrative optical distance measurement receiver 180 with an example bandpass network 118 in accordance with various examples. The example tuning network 118 of FIG. 3 includes a shunt inductor 302 connected in series with the photodiode 110 and the input of the TIA. In an embodiment, the shunt inductor 302 is optimized for a narrowband signal (i.e., the narrowband intensity modulated signal) at high frequency.

In the embodiment shown in FIG. 3, the shunt inductor 302 is located at the input of the TIA 112 to match the total capacitive reactance at the input (i.e., the fundamental capacitance provided by the photodiode 110). The inductance value of the inductor 302 is, in some embodiments, based on the resonance frequency for a parallel LC tank circuit:

$$f = \frac{L}{2\pi\sqrt{LC}}$$

where f is the desired operating frequency, C is the total input capacitance, and L is the shunt inductor 302 value. In some embodiments, for a more precise determination of the shunt inductor 302 value, the average SNR in the frequency of the narrowband of frequencies is maximized. To achieve SNR optimization, in an embodiment, all noise components at the TIA 112 output are added in the power domain. The SNR at the output of the TIA 112 is computed at each frequency. The average SNR in the narrowband of frequencies is optimized, in some embodiments, utilizing a numerical tool (e.g., MATLAB). In some embodiments, the highest operating frequency is chosen for the narrowband of light transmission signal 152 as a high frequency provides the fastest signal rise time (slope) and hence, the best ranging precision.

Figure 4:
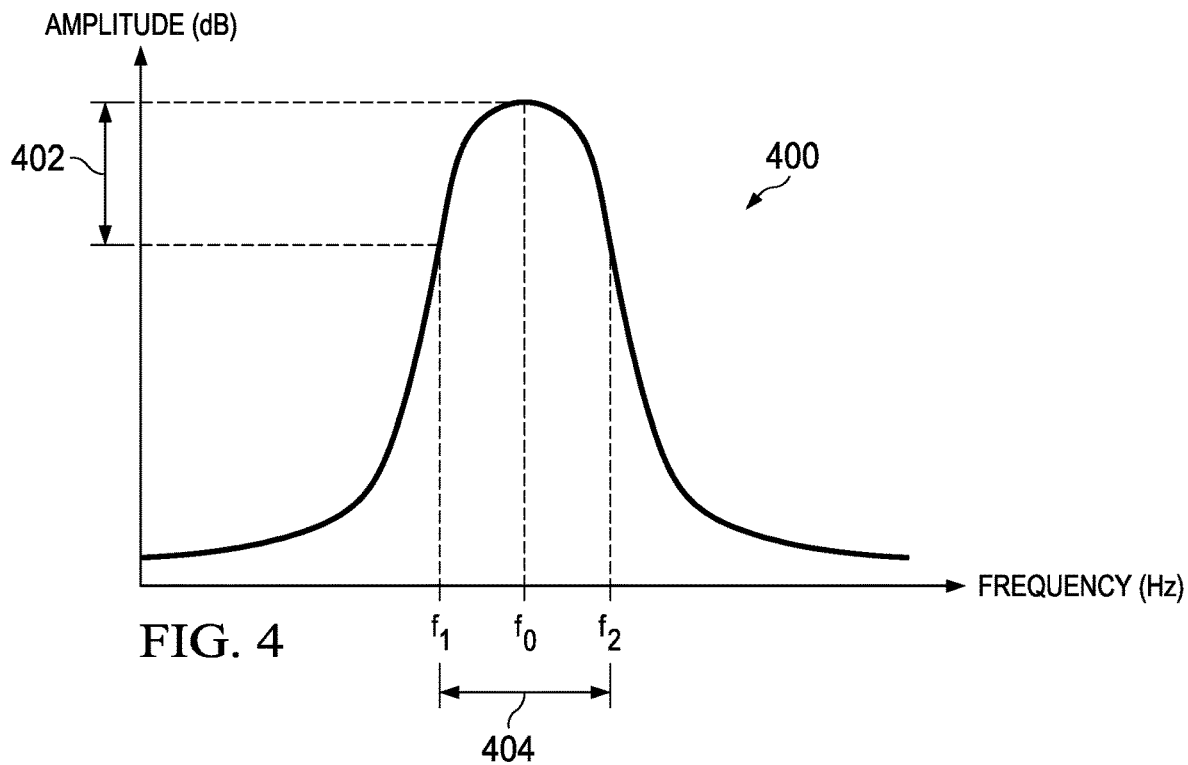
FIG. 4 shows an illustrative graph of amplitude versus frequency for an optical distance measurement receiver response in accordance with various examples.

FIG. 4 shows an illustrative graph 400 of amplitude versus frequency for an optical distance measurement receiver response in accordance with various examples. In some embodiments, the desired operating frequency $f_0$ is a center frequency with upper bound of the band of frequencies being at frequency $f_2$ and the lower bound of the frequencies being at frequency $f_1$. As shown in the graph 400 and discussed above, the tuning network 118 acting as a bandpass network filters out frequencies outside the narrowband of frequencies, bounded by the frequencies $f_1$ and $f_2$. In other words, the receiver 180, in some embodiments, only analyzes received signals (included the reflected light 154 and associated noise) that fall within the frequencies bound by frequencies $f_1$ and $f_2$ and filters out all other frequencies. Thus, the filtered current signal has a bandwidth shown by 404 (between frequencies $f_1$ and $f_2$) with an amplitude shown by 402. Therefore, by utilizing a bandpass network in the receiver and transmitting the light signals within the band of frequencies of the bandpass network (i.e., by going narrowband), noise is reduced in the band. Additionally, because of the resonant network in the receiver, the frequency of the signals can be higher than with a wideband system. Hence, the slope of the narrowband signal is increased. Thus, the optical distance measurement system, as discussed above in FIGS. 1-4, is able to increase ranging precision over conventional optical distance measurement systems.

Figure 5:
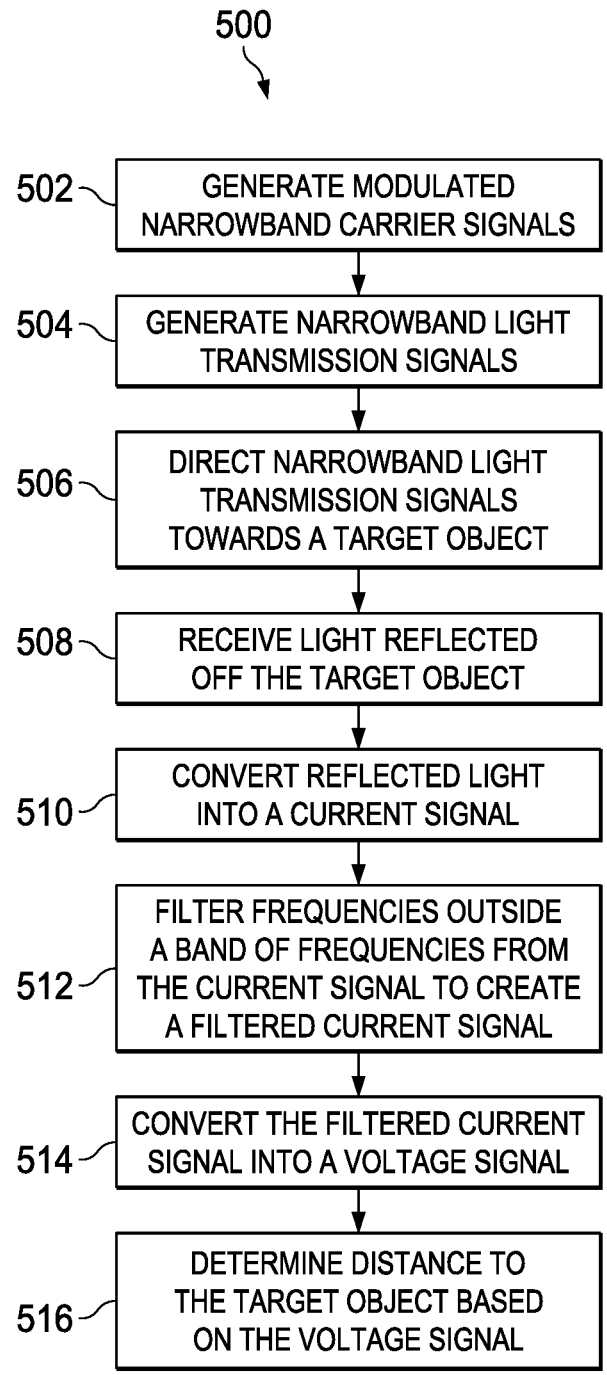
FIG. 5 shows an illustrative flow diagram of a method for determining a distance to a target object in accordance with various examples.

FIG. 5 shows an illustrative flow diagram of a method 500 for determining a distance to a target object in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, is performed by the transmitter 170 (including the modulation signal generator 102, transmission driver 104, and/or the laser diode 106) and/or the receiver 180 (including the photodiode 110, tuning network 118, TIA 112, and/or processor 114) and implemented in logic and/or by a processor executing instructions stored in a non-transitory computer readable storage medium.

The method 500 begins in block 502 with generating modulated narrowband carrier signals. For example, the modulation signal generator 102 generates narrowband carrier signals in a first band of frequencies and modulates the narrowband carrier signals. In some embodiments, a narrowband carrier signal is a signal within a band of frequencies of 20-30 MHz with the desired operating frequency being the center of the narrowband. In some embodiments, the desired operating frequency of the narrowband carrier signal is from 1 MHz to 999 GHz.

In block 504, the method 500 continues with generating narrowband light transmission signals. For example, the laser diode 106 may generate narrowband light transmission signals that match the modulated narrowband carrier signals. Thus, for example, if the desired operating frequency is 100 MHz, and the modulated narrowband carrier signals include carrier signals in a frequency band between 90 MHz and 110 MHz, then the laser diode 106 will generate light transmission signals in the same 90 MHz to 110 MHz frequency band.

The method 500 continues in block 506 with directing the narrowband light transmission signals towards a target object. For example, the laser diode 106 either alone or in conjunction with optics 108 may direct the narrowband light signals 152 toward the target object 116. In block 508, the method 500 continues with receiving light reflected off the target object. For example, the reflected light 154, with a frequency within the frequency band of the narrowband light transmission signals is received by the photodiode 110.

The method 500 continues in block 510 with converting the received reflected light into a current signal. For example, the photodiode 110 is configured to convert the received reflected light into the current signal 156 that is proportional to the intensity of the received light. In block 512 the method 500 continues with filtering frequencies outside a band of frequencies from the current signal to create a filtered current signal. For example, the tuning network 118 acting as a bandpass network is configured to receive and filter frequencies outside a frequency band that corresponds with the frequency band of the transmitted narrowband light transmission signals from the current signal 156, thus, removing noise from the signal.

The method 500 continues in block 514 with converting the filtered current signal into a voltage signal. For example, the TIA 112 receives the filtered current signal from the tuning network 118 and converts the filtered current signal into the voltage signal 158. In block 516, the method 500 continues with determining a distance to the target object based on the voltage signal. For example, the processor 114 is configured to receive the voltage signal 158 and determine the TOF of the transmitted narrowband light transmission signals 154 either directly (i.e., by timing the time it takes for the narrowband light transmission signal to travel from the laser diode 106 to the target object, reflect off the target object, and be received as reflected light from by the photodiode 110) and/or based on a detected phase shift between the transmitted narrowband light transmission signal 152 and the received reflected light 154. Once the TOF is determined, the distance to the target object 116 can be determined.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical distance measurement receiver comprising:
    a photodiode having an anode and a cathode, and configured to receive light reflected off an object over a first band of frequencies, and convert the received light into a photodiode current signal, the photodiode current signal proportional to an intensity of the received light;
    an inductor coupled between the anode and a ground terminal, the inductor configured to filter frequencies that are outside a second band of frequencies from the photodiode current signal, providing a filtered current signal;
    a transimpedance amplifier (TIA) having a first TIA input, a second TIA input and a TIA output, the first TIA input coupled to the inductor, the second TIA input coupled to the ground terminal, and the TIA output configured to provide a voltage signal proportional to the filtered current signal;
    a resistor having first and second resistor terminals, the first resistor terminal connected to the inductor, and the second resistor terminal connected to the TIA output and
    a capacitor having first and second capacitor terminals, the first capacitor terminal connected to the first resistor terminal, and the second capacitor terminal connected to the second resistor terminal.

2. The optical distance measurement receiver of claim 1, wherein a capacitance of the capacitor is tunable such that the receiver has a resonant frequency corresponding to a frequency of the received light.

3. The optical distance measurement receiver of claim 1, wherein:
    the photodiode is further configured to receive light reflected off the object over a third band of frequencies, the third band of frequencies being exclusive of the first band of frequencies;
    the further configured to filter frequencies outside a fourth band of frequencies from the photodiode current signal to create a second filtered current signal; and
    the TIA is further configured to receive the second filtered current signal from the tuning network and convert the second filtered current signal into a second voltage signal corresponding to the second filtered current signal.

4. The optical distance measurement receiver of claim 1, wherein the inductor is coupled between the first TIA input and the ground terminal.

5. The optical distance measurement receiver of claim 1, wherein an inductance of the inductor is determined by the first band of frequencies and a fundamental capacitance of the photodetector.

6. The optical distance measurement receiver of claim 1, further comprising a processing circuit configured to determine a distance from the optical distance measurement receiver to the object responsive to the voltage signal.

* * * * *